United States Patent [19]

Oishi

[11] 4,198,941
[45] Apr. 22, 1980

[54] METHOD FOR CONTROLLING THE DISTRIBUTION OF SPARK VOLTAGES TO ENGINE MULTIPLE CYLINDERS

[75] Inventor: Kazuo Oishi, Obu, Japan
[73] Assignee: Nippondenso Co., Ltd., Kariya, Japan
[21] Appl. No.: 946,076
[22] Filed: Sep. 26, 1978

[30] Foreign Application Priority Data

Dec. 2, 1977 [JP] Japan .................. 52-145278

[51] Int. Cl.² .............................. F02D 7/02
[52] U.S. Cl. ............... 123/146.5 A; 123/117 R; 123/117 D
[58] Field of Search ........... 123/106.5 A, 117 R, 123/117 D

[56] References Cited

U.S. PATENT DOCUMENTS

| | | | |
|---|---|---|---|
| 3,785,356 | 1/1974 | Niemoeller | 123/146.5 A |
| 3,853,103 | 12/1974 | Wahl et al. | 123/146.5 A |
| 3,998,196 | 12/1976 | House | 123/146.5 A |
| 4,009,699 | 3/1977 | Netzler et al. | 123/117 D |
| 4,015,565 | 4/1977 | Aono et al. | 123/146.5 A |
| 4,057,045 | 11/1977 | Stellwagen | 123/146.5 A |
| 4,080,939 | 3/1978 | Love | 123/117 R |
| 4,098,243 | 7/1978 | Yoshida et al. | 123/146.5 A |

*Primary Examiner*—Ira S. Lazarus
*Assistant Examiner*—R. A. Nelli
*Attorney, Agent, or Firm*—Cushman, Darby & Cushman

[57] ABSTRACT

A method for controlling the distribution of spark voltages generated by an ignition coil to spark plugs provided on multiple cylinders of a combustion engine. A spark voltage distributor is provided with a rotatable electrode connected to the ignition coil and multiple stationary electrodes connected to the respective spark plugs. The rotatable electrode is rotated by an electric motor at a speed depending upon the rotation speed of an engine output shaft and the rotational position of the output shaft indicative of the timing of spark voltage generation so that the engagement of the rotatable electrode with the stationary electrodes is synchronized with the spark voltage generation.

7 Claims, 7 Drawing Figures

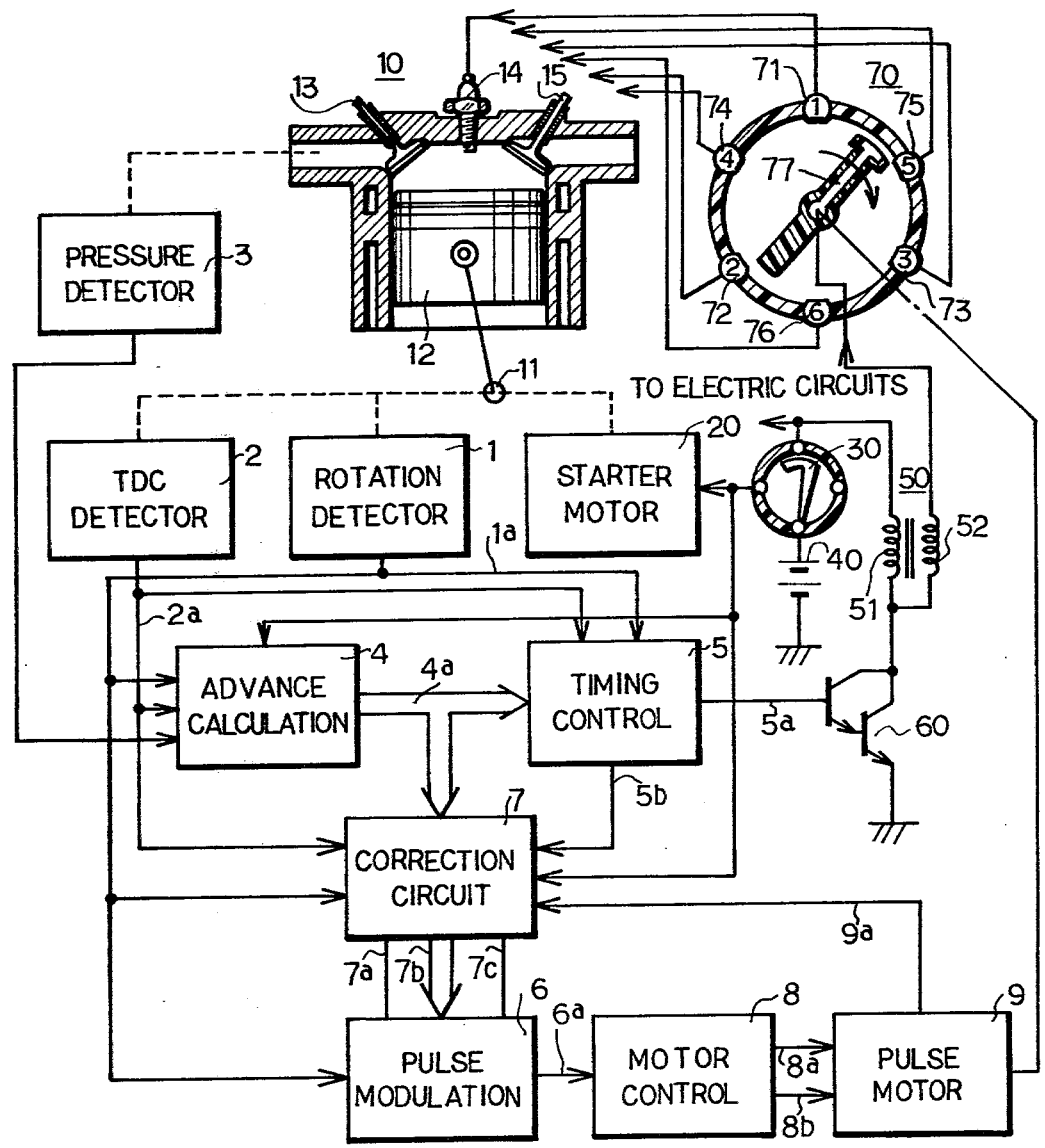

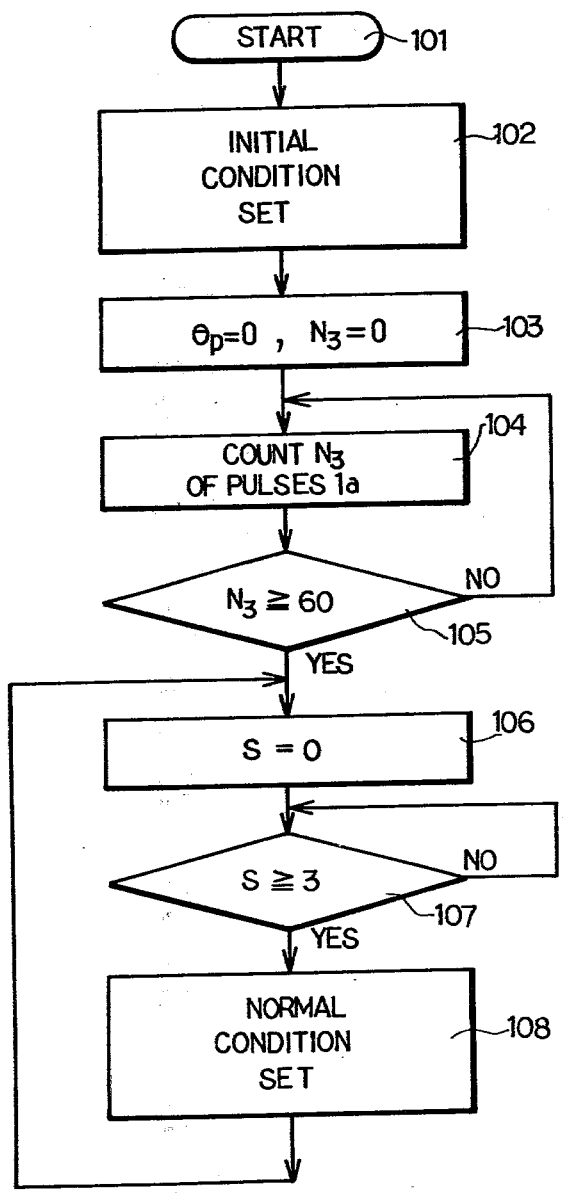

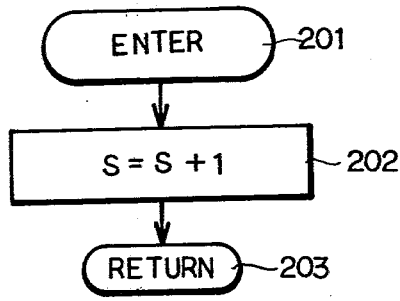
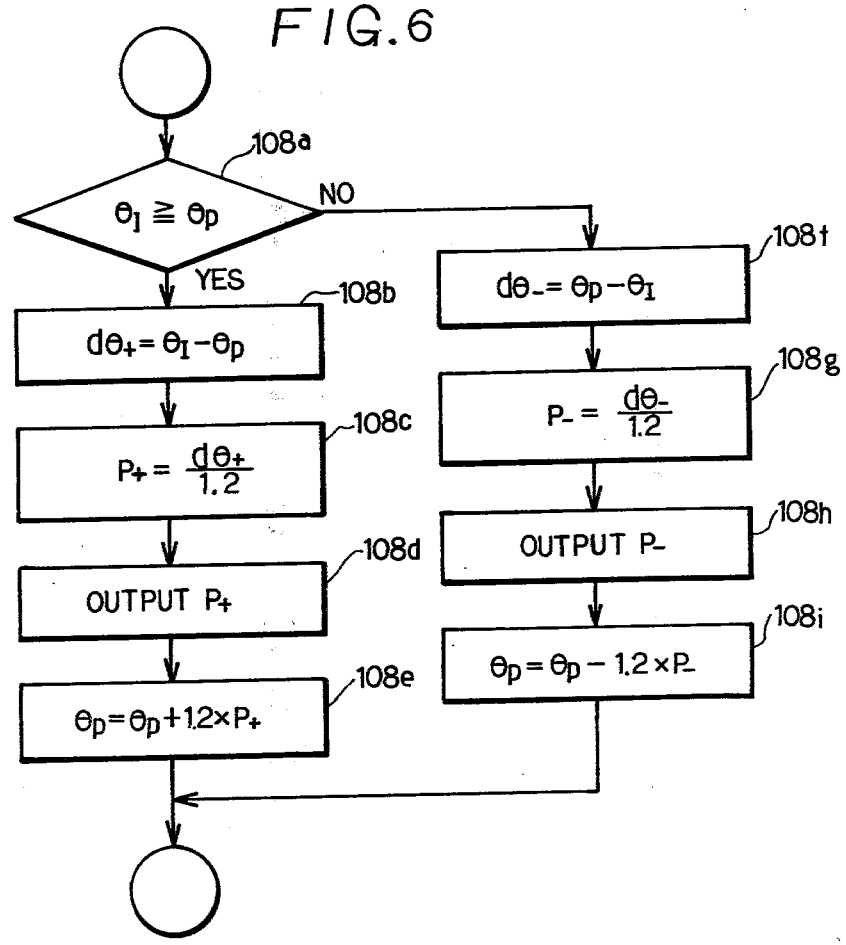

METHOD FOR CONTROLLING THE DISTRIBUTION OF SPARK VOLTAGES TO ENGINE MULTIPLE CYLINDERS

BACKGROUND OF THE INVENTION

The present invention relates to a method for controlling the distribution of spark voltages to multiple cylinders of a combustion engine and, in particular, to a method for controlling the rotation speed of the rotatable electrode of a spark voltage distributor associated with an ignition coil and multiple spark plugs.

In a multi-cylinder combustion engine, combustible mixtures supplied to multiple cylinders are sequentially ignited by respective spark voltages generated by an ignition coil and distributed to multiple spark plugs to rotate the engine output shaft which responsively produce an output torque. The timing of spark ignition must be controlled in response to changes in the operating conditions of the combustion engine to increase the engine output torque, or operate the engine at the possible highest efficiency. For this reason it is desirable to associate with the engine an electronic spark ignition control system in which spark voltage generation of the ignition coil is controlled electronically. Even with the electronic spark ignition control system having a capability of precise ignition timing control, spark voltages generated by the ignition coil must be distributed to the respective spark plugs.

It is general to associate with the ignition coil and the spark plugs a spark voltage distributor having a rotatable electrode connected to the ignition coil and stationary electrodes to the respective spark plugs. With the rotatable electrode being coupled to the engine output shaft to rotate therewith, the spark voltage distributor is enabled to distribute the spark voltages to the respective spark plugs upon engagement of the rotatable electrode with the stationary electrodes which are spaced from each other and encircle the rotatable electrode. The spark voltage distributor mechanically coupled to the engine output shaft is not advantageous in that the distributor is necessarily mounted close to the engine output shaft and that, when the timing of spark voltage generation is advanced greatly, the spark voltages are likely to be distributed to improper spark plugs due to flash-over of the spark voltages which occurs between the rotatable electrode and the stationary electrodes disengaged from the rotatable electrode. As to flash-over of the spark voltages, it occurrs more frequently when the number of stationary electrodes, or the number of engine cylinders, increases to result in narrowed spacing between stationary electrodes.

SUMMARY OF THE INVENTION

It is therefore a primary object of the invention to distribute spark voltages to multiple cylinders of a combustion engine through a spark voltage distributor which is driven electrically.

It is a further object of the invention to rotate the rotatable electrode of a spark voltage distributor by an electric motor.

It is a still further object of the invention to control the rotation speed of an electric motor coupled to a spark voltage distributor in response to the rotation speed of an engine output shaft and the timing of spark voltage generation.

BRIEF DESCRIPTION OF THE DRAWINGS

In the accompanying drawings:

FIG. 1 is a schematic diagram illustrating the embodiment according to the present invention;

FIG. 2 is an electric wiring diagram illustrating the pulse modulation circuit illustrated in FIG. 1;

FIG. 3 is a major flow chart illustrating the sequence of operation of the microcomputer employed in the correction circuit illustrated in FIG. 1;

FIG. 5 is another flow chart illustrating the first interrupt sequence of operation of the microcomputer;

FIG. 6 is a minor flow chart illustrating the detailed sequence of operation of the microcomputer in the normal condition set step illustrated in FIG. 3.

DESCRIPTION OF THE PREFERRED EMBODIMENT

Figure 4:
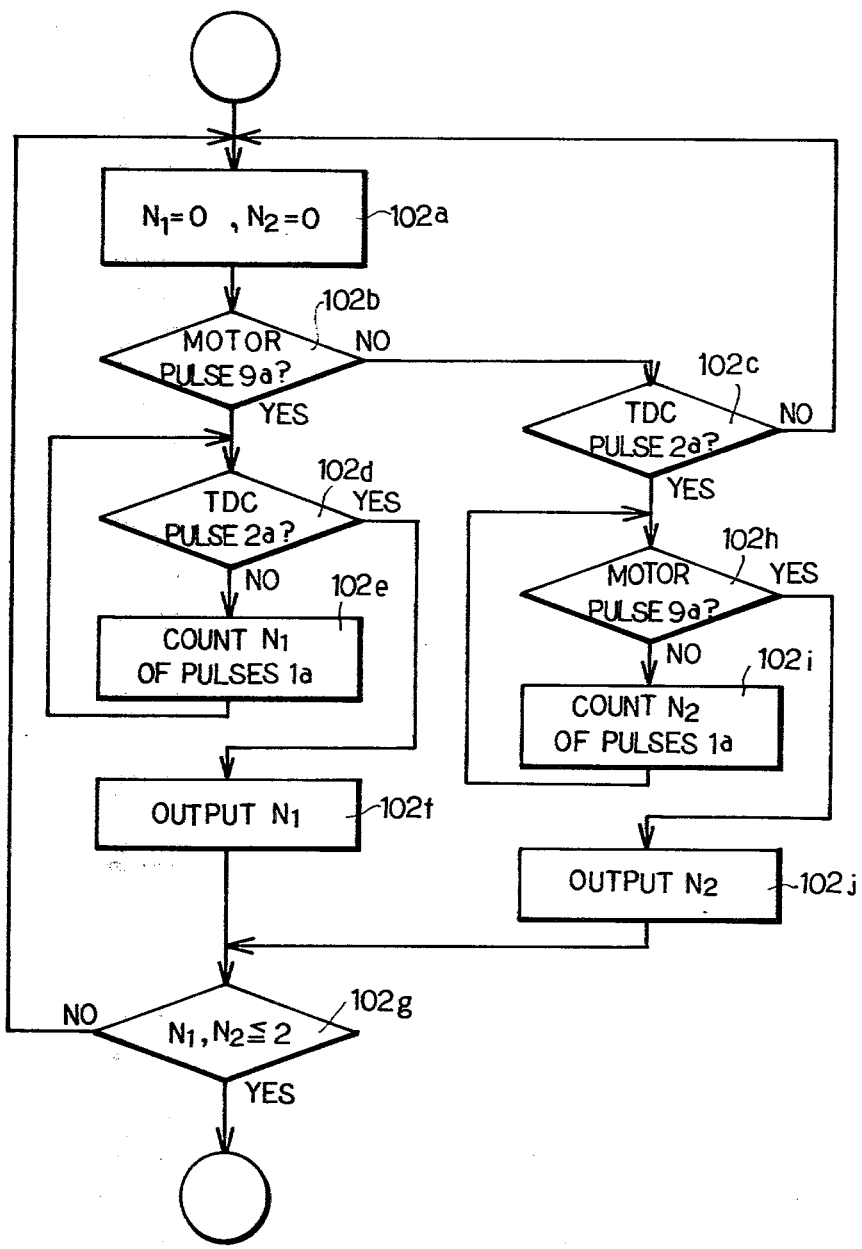
FIG. 4 is a minor flow chart illustrating the detailed sequence of operation of the microcomputer in the initial condition set step illustrated in FIG. 3.

Referring first to FIG. 1, a six-cylinder four-stroke internal combustion engine 10 having a crankshaft 11 is schematically illustrated. Each cylinder of the engine 10 comprises a piston 12 which reciprocates to rotate the crankshaft 11, an intake valve 13 which opens to admit air-fuel combustible mixture during piston downward movement, a spark plug 14 which ignites the mixture during piston upward movement so that the piston 12 is moved downward by the combustion of the mixture, and an exhaust valve 15 which opens to emit combustion exhaust during piston upward movement. The crankshaft 11 has a toothed crown wheel (not illustrated) engageable with a starter motor 20 which is energized by a storage battery 40 through a key switch 30 to crank the engine 10. An ignition coil 50 is connected in series with the key switch 30, the battery 40 and a power transistor 60 so that, when a primary winding 51 is deenergized at the transition of the transistor 60 from conduction to nonconduction, a secondary winding 52 generates a spark voltage. A spark voltage distributor 70 is associated with the ignition coil 50 and the spark plugs 14 of the engine 10. The distributor 70 has a rotatable electrode 77 electrically connected to the coil 50 and six stationary electrodes 71, 72, 73, 74, 75 and 76 electrically connected to the six spark plugs 14 of the first, second, third, fourth, fifth and sixth cylinders of the engine 10, respectively. The stationary electrodes 71, 75, 73, 76, 72 and 74 are arranged to encircle the rotatable electrode 77 in the named order in view of the firing order of the engine 10 and spaced equally from each other by an electric insulating member. The rotatable electrode 77 is arranged to engage with the stationary electrodes 71 to 76 one by one during the rotation thereof so that the spark voltages supplied from the ignition coil 50 are sequentially distributed to respective spark plugs 14.

Provided for controlling the timing of spark voltage generation in the ignition coil 50 are a rotation detector 1 associated with the crankshaft 11, a top dead center detector (TDC) detector 2 associated with the crankshaft 11, a pressure detector 3 associated with the intake manifold of the engine 10, an advance calculation circuit 4 connected to the detectors 1, 2 and 3, and a timing control circuit 5 connected between the advance calculation circuit 4 and the power transistor 60. The rotation detector 1 may employ a conventional magnetic pick-up associated with the toothed crown wheel to generate a rotation pulse each time a tooth of the crown wheel passes. With the toothed crown wheel having 150 teeth thereon the rotation detector 1 produces in each rotation of the crankshaft 11 a train of 150 rotation pulses 1a each of which has a time interval corresponding to a uniform angular interval of 2.4 degrees in crankshaft rotation. The TDC detector 2 may also employ a conventional magnetic pick-up associated with another wheel (not illustrated) which is rotated once in two rotations of the crankshaft 11 and has a single tooth thereon. With the single tooth being provided to pass through the magnetic pick-up when the piston 12 reaches the top dead center at the transition from the compression to power strokes of the first cylinder of the engine 10, the TDC detector produces a TDC pulse 2a in two rotations of the crankshaft 11. The advance calculation circuit 4 may employ a memory in which desired ignition advance angles relative to the piston top dead center are preliminarily programed in binary code in correspondence with the pressure in the intake manifold and the rotation speed of the crankshaft 11. The intake pressure detected in analogue form by the pressure detector 3 may be converted into binary code by a conventional analog-to-digital converter, while the rotation speed may be detected in binary code by a counter which counts the rotation pulses 1a produced from the rotation detector 1 during a predetermined time interval in response to the TDC pulse 2a. The advance calculation circuit 4 is connected to the starter motor 20 so that, while the motor 20 is energized to crank the engine 10, the ignition advance angle is determined to be zero irrespective of the crankshaft rotation speed and the intake pressure. The timing control circuit 5 may employ a conventional pulse generator which generates output pulses 5a for respective engine cylinders. The pulse generator is controlled by the rotation pulses 1a, the TDC pulse 2a and the binary code signal 4a indicative of the desired ignition spark advance angle so that each output pulse 5a appears when each piston 12 reaches a predetermined crank angular position and disappears when each piston 12 reaches a crank angular position corresponding to the desired ignition advance angle. The transistor 60, being rendered conductive in response to each output pulse 5a, is rendered nonconductive to deenergize the primary winding 51 of the ignition coil 50 upon disappearance of the output pulse 5a. As a result, the timing of the ignition spark voltage generated from the secondary winding 52 upon deenergization of the primary coil 51 can be controlled in response to the binary code signal 4a. The timing control circuit 5 produces a timing pulse 5b in synchronism with the disappearance of each output pulses 5a.

The distributor rotatable electrode 77 to which the spark voltages are supplied from the ignition coil 50 is coupled to the rotatable shaft of an electric pulse motor (a stepping motor) 9 which is connected to a motor control circuit 8. The motor control circuit 8 may be of the type which divides input pulses in frequency to produce a first and second trains of pulses 8a and 8b which are one half in frequency relative to the input pulses and different in phase to each other. The pulse motor 9 may be of the type which rotates the rotatable shaft 1.2 degrees in response to each of the pulses 8a and 8b to result in one rotation of the rotatable electrode 77 in response to 300 pulses applied to the motor control circuit 8. With the rotation pulses 1a being applied to the motor control circuit 8, the rotatable electrode 77 is rotated once by the pulse motor 9 per two rotations of the crankshaft 11, that is, the rotatable electrode 77 is rotated at one half speed of the crankshaft rotation speed. The pulse motor 9 is adapted to produce a motor pulse 9a indicative of the complete engagement of the rotatable electrode 77 with the stationary electrode 71 connected to the spark plug 14 of the first cylinder. The motor pulse 9a may be produced by a magnetic pick-up which responds to the passing of the single tooth provided on the rotatable shaft of the pulse motor 9.

For controlling the rotation speed of the distributor rotatable electrode 77 in dependence on the timing of spark voltage generation as well are provided a pulse modulation circuit 6 and a correction circuit 7 utilizing a microcomputer the operation sequence of which will be described later with reference to FIGS. 3 to 7. The correction circuit 7 receives the rotation pulses 1a, the TDC pulse 2a, the motor pulse 9a and the starter signal of the starter motor 20 to calculate the desired change in the rotation speed of the rotatable electrode 77 relative to the rotation speed of the crankshaft 11 so that, when the starter motor 20 is energized to crank the engine 10, the rotatable electrode 77 engages with the stationary electrode 71 in synchronism with the arrival of the first cylinder piston 12 to the top dead center where the spark voltage is generated. The correction circuit 7 further receives the binary code signal 4a and the timing pulse 5b to calculate the desired change in the rotation speed of the rotatable electrode 77 relative to the rotation speed of the crankshaft 11 so that, when the starter motor 20 is not energized, the rotatable electrode 77 engages with the stationary electrodes 71 to 76 one by one in synchronism with the generation of the spark voltages in the ignition coil 50. The correction circuit 7, calculating the desired speed changes, produces a binary code signal 7b corresponding to the desired speed change in terms of the number of pulses which are to be added to or subtracted from the rotation pulses 1a. A first and second preset pulses 7a and 7c are produced in association with the binary code signal 7b to indicate the increase and decrease in the rotation speed of the rotatable electrode 77, respectively. The pulse modulation circuit 6 to which the preset pulses 7a and 7c and the binary code signal 7b are applied is connected between the rotation detector 1 and the motor control circuit 8. As can be understood from the description made later with reference to FIG. 2, the pulse modulation circuit 6 performs frequency-multiplication and frequency-division on the rotation pulses 1a to produce a train of pulsenumber modulated pulses 6a applied to the motor control circuit 8.

As illustrated in FIG. 2, the pulse modulation circuit 6 comprises a frequency multiplier 61 and a frequency divider 62. The frequency multiplier comprises a pulse generator 611 for generating a train of pulses which is same in frequency but different in phase relative to the rotation pulses 1a, a presettable down counter 612, an AND gate 613 and an OR gate 614. When the binary code signal 7b indicative of the number of pulses to be modulated is applied to the counter 612 in association with the first preset pulse 7a, the counter 612 presets the binary number therein and produces a high level output signal. With this high level output signal, the AND gate 613 allows the pulses applied from the pulse generator 611 to pass to the counter 612 which counts down the preset binary number in response thereto. When the number of pulses applied from the AND gate 613 to the counter 612 reaches the preset binary number, that is, the preset binary number is counted down to zero, the counter 612 produces a low level output signal. With this low level output signal, the AND gate 613 prevents the pulses of the pulse generator 611 from passing therethrough. As a result, the number of pulses passed through the AND gate 613 is limited to be equal to the binary number preset in the counter 612. The OR gate 614, passing the rotation pulses 1a therethrough, passes the pulses applied from the AND gate 613 so that, while the counter 612 is in down count operation, the frequency of the pulse produced from 614 becomes twice as high as the frequency of the rotation pulses 1a. The frequency divider 62 comprises a flip-flop 621, a presettable down counter 622 and an AND gate 623. When the binary code signal 7b indicative of the number of pulses to be modulated is applied to the counter 622 in association with the second preset pulse 7c, the counter 622 presets the binary number therein and produces a high level output signal. With this high level output signal, the flip-flop 621 is released from the reset condition to subject the pulses produced from the OR gate 614 to frequency division. The flip-flop 621 supplies from the noninverting output the counter 622 with frequency-divided pulses which is one half in frequency relative to the pulses produced from the OR gate 614. When the number of frequency-divided pulses reaches the binary number preset in the counter 622, that is, the preset binary number is counted down to zero, the counter 622 produces a low level output signal. The flip-flop 621 which produces inverted frequency-divided pulses from the inverting output during frequency-dividing operation produces a high level output signal from the inverting output, when it is reset by the low level output signal of the counter 622. The AND gate 623 passes the pulses produced from the OR gate 614 only when the output signal produced from the inverting output of the flip-flop 621 is kept at high level. As a result, while the counter 622 is in down count operation, the pulses 6a produced from the AND gate 623 becomes one half as low as the pulses produced from the OR gate 614 in frequency. It should be understood in the pulse modulation circuit 6 that the frequency-multiplication and frequency-division on the rotation pulses 1a result in the respective increase and decrease in the number of modulated pulses 6a each of which indicates 1.2 degrees rotation of the pulse motor 9 and the associated distributor electrode 77.

As described before, the correction circuit 7 which calculates the number of pulses to be increased or decreased relative to the rotation pulses 1a employs a microcomputer the operation sequence of which is preliminarily programed as illustrated in FIGS. 3 to 7. The microcomputer starts its calculation operation at a start step 101 illustrated in FIG. 3, when the starter motor 20 is energized by the battery 40 to crank the engine 10. It should be recalled that, with the starter signal being applied to the advance calculation circuit 4, the ignition advance angle is determined zero indicative of the generation of spark voltage at the top dead center of the piston 12, or at the transition from the compression to power strokes in each cylinder. After the start step 101, an initial condition set step 102 illustrated in detail in FIG. 4 is performed so that the motor pulse 9a produced from the pulse motor 9 is synchronized with the TDC pulse 2a produced from the TDC detector 2.

Referring to FIG. 4, two values $N_1$ and $N_2$ indicative of the numbers of rotation pulses 1a produced between the generations of the motor pulse 9a and the TDC pulse 2a are set initially at zeros at a step 102a. At the next step 102b, it is discriminated whether the motor pulse 9a is generated. With the discrimination result being NO, it is discriminated at a step 102c whether the TDC pulse 2a is generated. With the discrimination result being NO, the microcomputer returns to the step 102a to repeat it again. With the discrimination result of the step 102b being YES, it is discriminated at a step 102d whether the TDC pulse 2a is generated. With the discrimination result being NO, the rotation pulses 1a produced after the generation of the motor pulse 9a are counted at a step 102e which is followed by the step 102d. With the discrimination result of the step 102d being YES, the value $N_1$ of rotation pulses 1a counted at the step 102e is produced as the binary code signal 7b at a step 102f. Since the step 102e is performed only when the motor pulse 9a is generated prior to the TDC pulse 2a, the value $N_1$ indicates the number of pulses to be subtracted from the rotation pulses 1a. Therefore, the second preset pulse 7c indicative of the frequency division is produced at the step 102f. On the other hand, when the discrimination result of the step 102c is YES, it is discriminated at a step 102h whether the motor pulse 9a is generated. With the result being NO, the rotation pulses 1a produced after the TDC pulse 2a are counted at a step 102i which is followed by the step 102h. With the discrimination result of the step 102h being YES, the value $N_2$ of rotation pulses 1a counted at the step 102i is produced as the binary code signal 7b at a step 102j. Since the step 102i is performed only when the TDC pulse 2a is generated prior to the motor pulse 9a, the value $N_2$ indicates the number of pulses to be added to the rotation pulses 1a. Therefore, the first preset pulse 7a indicative of the frequency multiplication is produced at the step 102j. After the step 102f or 102j, it is discriminated at a step 102g whether the value $N_1$ or $N_2$ is equal to or smaller than a constant value 2. With the discrimination result being NO, the microcomputer returns to the step 102a to repeat the abovedescribed steps. On the other hand, with the discrimination result of the step 102g being YES indicative of the substantial engagement of the electrode 77 with the electrode 71, the microcomputer completes the abovedescribed steps to proceed from the initial condition set step 102 to the following step 103 illustrated in FIG. 3.

At the step 103, a motor advance angle $\theta_P$ and rotation pulse number $N_3$ are set at zeros. The advance angle $\theta_P$ is indicative of the angular difference between the rotatable electrode 77 and the stationary electrode 71 at a timing of TDC pulse generation, while the rotation pulse number $N_3$ is indicative of the number of rotation pulses 1a produced from the timing of TDC pulse generation. After the step 103, the number $N_3$ of rotation pulses 1a is counted at a step 104. It is discriminated at a step 105 whether the number $N_3$ is equal to or larger than a constant value 60. With the discrimination result being NO, the steps 104 and 105 are repeated. When the discrimination result is changed to YES, the following step 106 is performed. The discrimination result YES is indicative of the 72 degrees angular rotation of the rotatable electrode 77 from the stationary electrode 71. By the angular rotation of 72 degrees, the rotatable electrode 77 is positioned between the stationary electrodes 75 and 73.

At the step 106, the number S of spark voltage generations is set at zero so that the microcomputer is enabled to perform a first interrupt operation sequence illustrated in FIG. 5. When the timing pulse 5b indicative of the spark voltage generation is applied, the microcomputer enters into the interrupt operation at a step 201 and proceeds to a step 202 to add one to the number S of spark voltage generations. The number S of spark voltage generations is set at a newly obtained number S+1 in the step 202. After the step 202, the microcomputer temporarily completes the first interrupt operation at a step 203. When the first interrupt operation is completed, the microcomputer proceeds to a step 107 illustrated in FIG. 3 to discriminate whether the number S of spark voltage generations is equal to or larger than a constant value 3. With the discrimination result being NO, the first interrupt operation illustrated in FIG. 5 is repeated. With the discrimination result of the step 107 being YES, the microcomputer proceeds to a normal condition set step 108 illustrated in FIG. 6 in detail. Since the steps 106 and 107 are performed after the step 105, the normal condition set step 108 is performed for the first time when the ignition spark voltage which is to be applied to the stationary electrode 72 is generated. Provided that the normal condition set step 108 is completed, the microcomputer 108 returns to the step 106 to perform the normal condition set step 108 for the second time when the ignition spark voltage which is to be applied to the stationary electrode 75 is generated. In such a manner as described above, the normal condition set step 108 is repeated each time the ignition spark voltage which is to be applied to either one of the stationary electrodes 75 and 72 is generated.

As illustrated in FIG. 6, the normal condition set step 108 starts from a step 108a in which it is discriminated whether the ignition advance angle $\theta_I$ is equal to or larger than the motor advance angle $\theta_P$. It should be recalled that the ignition advance angle $\theta_I$ is calculated in the advance calculation circuit 4 and that the motor advance angle $\theta_P$ is primarily set at zero at the step 103. With the result of the step 108a being YES, an angular difference $d\theta+$ between the angles $\theta_I$ and $\theta_P$ is calculated at a step 108b and the resultant difference $d\theta+$ is divided by a constant value 1.2 in a step 108c to derive the number P+ of pulses which is to be added to the rotation pulses 1a. The number P+ is produced from the microcomputer as the binary code signal 7b in association with the first preset pulse 7a at a step 108d. After the step 108d, a product 1.2×P+ is added to the motor advance angle $\theta_P$ at a step 108e so that the motor advance angle $\theta_P$ which is to be used next at the step 108a is set at a newly obtained value $\theta_P+1.2\times P+$. On the other hand, with the result of the step 108a being NO, an angular difference $d\theta-$ between the angles $\theta_I$ and $\theta_P$ is calculated at a step 108f and the resultant difference $d\theta-$ is divided by the constant value 1.2 in a step 108g to derive the number P− of pulses which is to be subtracted from the rotation pulses 1a. The number P− is produced as the binary code signal 7b in association with the second preset pulse 7c at a step 108h. After the step 108h, a product 1.2×P− is subtracted from the motor advance angle $\theta_P$ at a step 108i so that the motor advance angle $\theta_P$ which is to be used next at the step 108a is set at a newly obtained value $\theta_p-1.2\times P-$.

Figure 7:
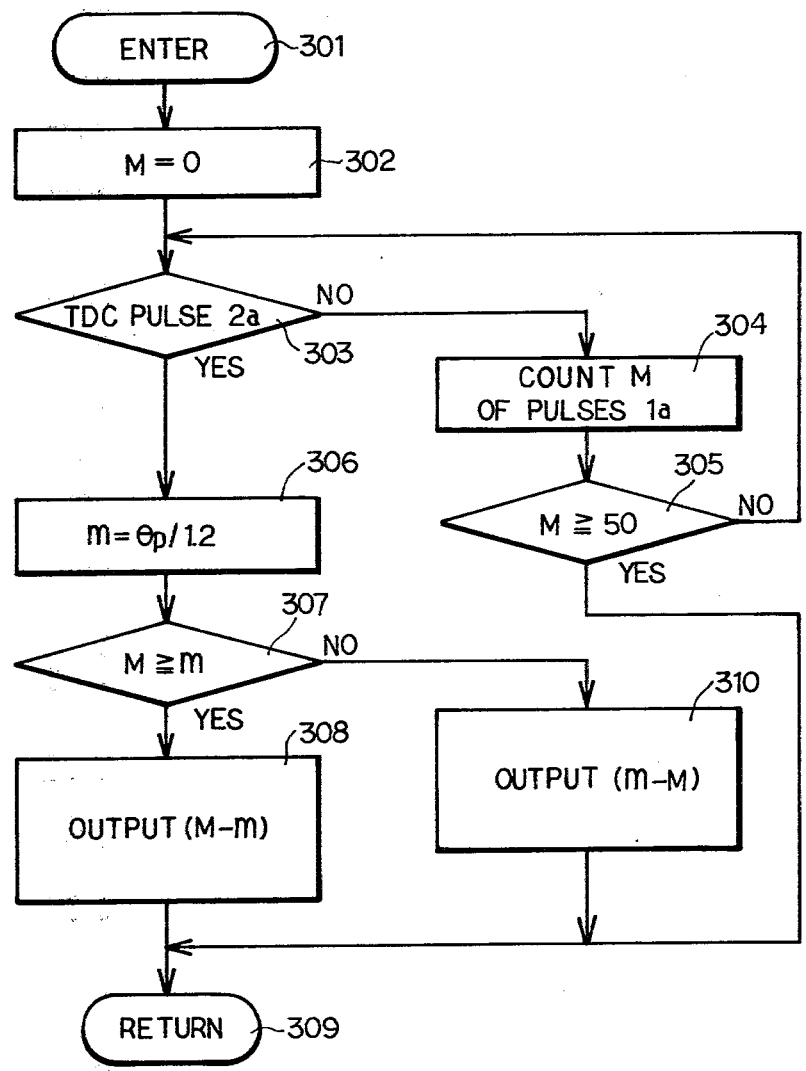
FIG. 7 is a still another flow chart illustrating the second interrupt sequence of operation of the microcomputer.

In addition to the abovedescribed operation sequences, the microcomputer has the second interrupt operation sequence illustrated in FIG. 7 to examine whether the actual motor advance angle is equal to the desired motor advance angle $\theta_P$ calculated in the normal condition set step 108 illustrated in FIG. 6. The second interrupt sequence is entered at a step 301, when the motor pulse 9a is applied from the pulse motor 9. After the step 301, the number M of rotation pulses 1a produced between the motor pulse 9a and TDC pulse 2a is set at zero primarily at a step 302. It is discriminated at the following step 303 whether the TDC pulse 2a is produced. With the discrimination result being NO, the number M of rotation pulses 1a is counted at a step 304 and it is discriminated at a step 305 whether the number M is equal to or larger than a constant value 50. With the result being NO, the steps 303, 304 and 305 are repeated. When the TDC pulse 2a is produced, the discrimination result of the step 303 changes to YES so that the following step 306 is performed. At the step 306, the desired motor advance angle $\theta_P$ is divided by the constant value 1.2 to derive the number m of pulses required for the angular rotation $\theta_P$ of the rotatable electrode 77. After the step 306, it is discriminated at a step 307 whether the number M is equal to or larger than the number m. After the step 307, the difference between the numbers M and m is calculated at steps 308 and 310 in response to respective discrimination results YES and NO of the step 307 so that either one of the resultant differences (M-m) and (m-M) is produced as the binary code signal 7b. Since the discrimination results YES and NO of the step 307 indicate that the actual motor advance angle is larger and smaller than the desired motor advance angle $\theta_P$, respectively, the second and first preset pulses 7c and 7a are produced also at respective steps 308 and 310. After the steps 308 and 310, the second interrupt operation sequence responsive to the motor pulse 9a is temporarily completed at a step 309. It should be noted that the second interrupt operation is completed also in response to the discrimination result YES of the step 305 indicative of the engagement of the rotatable electrode 77 with the stationary electrode 75.

In operation, when the starter motor 20, the ignition coil 50 and the electric circuits illustrated in FIG. 1 are connected to the battery 40 through the switch 30, the engine 10 is cranked by the starter motor 20 so that the piston 12 reciprocates to rotate the crankshaft 11. During engine cranking condition, the advance calculation circuit 4 determines the ignition advance angle $\theta_I$ to be zero in response to the starter signal so that the spark voltages are generated from the ignition coil 50 at the arrival of each piston 12 to the top dead center. The correction circuit 7 performs the initial condition set step 102 illustrated in FIG. 4 in response to the starter signal so that the number $N_1$ or $N_2$ of pulses which is indicative of the angular difference between the TDC pulse 2a and motor pulse 9a and to be added to or subtracted from the rotation pulses 1a is represented by the binary code signal 7b. The pulse modulation circuit 6 illustrated in FIG. 2 performs pulse number modulation in response to the binary code signal 7b to produce the modulated pulses 6a which is increased by the number $N_2$ or decreased by the number $N_1$ in number relative to the rotation pulses 1a. The motor control circuit 8 controls the pulse motor 9 so that the rotatable electrode 77 is rotated by 1.2 rotation angles in response to each of the modulated pulses 6a. By the modulation pulses 6a which are increased and decreased in number, the motor 9 increases and decreases the rotation speed of the rotatable electrode 77, respectively. When the TDC pulse 2a and the motor pulse 9a is applied at the same time substantially, the pulse modulation circuit 6 performs no pulse number modulation so that the pulse motor 9 rotates the rotatable electrode 77 at a half rotation speed of the crankshaft 11. As a result, the rotatable electrode 77 engages with the stationary electrodes 71, 75, 73, 76, 72, 74 and 71 one by one in synchronism with the generation of spark voltages so that the spark voltages are sequentially distributed to respective spark plugs 14 by the spark voltage distributor 70.

Once the motor pulse 9a indicative of the engagement of the rotatable electrode 77 with the stationary electrode 71 is synchronized with the TDC pulse 2a, the correction circuit 7 performs the first interrupt operation illustrated in FIG. 5 in response to the timing pulses 5b corresponding to the engagement of the rotatable electrode 77 with the stationary electrodes 71 to 76 so that, each time the rotatable electrode 77 engages with the stationary electrodes 72 and 75, the correction circuit 7 performs the normal condition set 108 illustrated in FIG. 6. Since the ignition advance angle $\theta_I$ and the motor advance angle $\theta_P$ are both zeros during engine cranking condition, the correction circuit 7 produces the binary code signal 7b indicative of no pulse number correction on the rotation pulses 1a. As a result, the pulse motor 9 rotates the rotatable electrode 77 at a speed proportional to the crankshaft rotation speed or at the half rotation speed of the crankshaft 11. The correction circuit 7 performs the second interrupt operation illustrated in FIG. 7 each time the motor pulse 9a indicative of the engagement of the rotatable electrode 77 with the stationary electrode 71 is applied. Provided that the TDC pulse 2a and the motor pulse 9a which are to be synchronous during engine cranking condition are not synchronous, the binary code signal 7b indicative of the number of pulses to be added to or subtracted from the rotation pulses 1a is produced so that the TDC pulse 2a and the motor pulse 9a becomes synchronous with each other.

On the other hand, when the starter motor 20 is disengaged from the battery 20 to complete the engine cranking, the advance angle calculation circuit 4 changes the advance angle $\theta_I$ of spark voltage generation relative to the piston top dead center in accordance with the rotation speed of the crankshaft 11 and the intake pressure of the engine 10. Each time the number of timing pulses 5b reaches the constant value 3 upon generation of spark voltages which is to be distributed to the stationary electrodes 72 and 75 by the rotatable electrode 77, the correction circuit 7 calculates the number of pulses to be added to or subtracted from the rotation pulses 1a in the normal condition set step 108 in accordance with the binary code signal 4a indicative of the ignition advance angle $\theta_I$. Provided that the ignition advance angle $\theta_I$ is increased, the correction circuit 7 performs the steps 108a, 108b, 108c, 108d and 108e in the normal condition set step 108 to produce, in association with the first preset pulse 7a, the binary code signal 7b indicative of the desired number of pulses to be added to the rotation pulses 1a. As a result, the modulated pulses 6a is increased in number relative to the rotation pulses 1a so that the pulse motor 9 responsively increases the rotation speed of the rotatable electrode 77 to engage the rotatable electrode 77 with the stationary electrodes 71 to 76 one by one in synchronism with the spark voltage generation in the ignition coil 50. On the other hand, provided that the ignition advance angle $\theta_I$ is decreased, the correction circuit 7 performs the steps 108a, 108f, 108g, 108h and 108i in the normal condition set step 108 to produce, in association with the second preset pulse 7c, the binary code signal 7b indicative of the desired number of pulses to be subtracted from the rotation pulses 1a. As a result, the modulation pulses 6a is decreased in number relative to the rotation pulses 1a so that the pulse motor 9 responsively decreases the rotation speed of the rotatable electrode 77 to engage the rotatable electrode 77 with the stationary electrodes 71 to 76 one by one in synchronism with the spark voltage generation in the ignition coil 50. It should be noted that, although the rotation speed of the rotatable electrode 77 which is fundamentally one half of the crankshaft rotation speed is corrected only twice in each rotation of the rotatable electrode 77 in accordance with the changes in the ignition advance angle $\theta_I$, the distribution of spark voltages is effectuated properly owing to the fact that the ignition advance angle $\theta_I$ rarely changes greatly between two or three successive spark voltage generations.

On the other hand, when the motor pulse 9a indicative of the engagement of the rotatable electrode 77 with the stationary electrode 71 is produced from the pulse motor 9, the correction circuit 7 performs the second interrupt operation illustrated in FIG. 7 to calculate the angular difference between the desired motor advance angle $\theta_P$ and the actual motor advance angle. This angular difference is calculated in view of the angular difference between the motor pulse 9a and the TDC pulse 2a. Provided that the angular difference between the two pulses 2a and 9a are substantially equal to the desired motor advance angle $\theta_P$, the correction circuit 7 produces the binary code signal 7b indicative of no pulse number correction on the rotation pulses 1a. However, provided that the angular difference between the two pulses 2a and 9a is larger or smaller than the desired motor advance angle $\theta_P$, the correction circuit 2 produces the binary code signal 7b indicative of the number of pulses to be subtracted from or added to the rotation pulses 1a in association with the second and first preset pulses 7c and 7a, respectively. As a result, the pulse motor 9 changes the rotation speed of the rotatable electrode 77 so that the angular difference between the motor pulse 9a and the TDC pulse 2a becomes substantially equal to the desired motor advance angle $\theta_P$, that is, the rotatable electrode 77 engages with the stationary electrodes 71 to 76 one by one without fail in synchronism with the generation of spark voltages in the ignition coil 50.

The present invention having been described is not limited to the preferred embodiment but may be modified without departing from the spirit of the invention.

What is claimed is:

1. A method for controlling the distribution of spark voltages to multiple cylinders of a combustion engine having an output shaft by a spark voltage distributor having stationary electrodes and a rotatable electrode arranged to engage with said stationary electrodes one by one so that the combustible mixture supplied to said cylinders is ignited sequentially by ignition spark voltages to rotate said output shaft, said method comprising the steps of:
    detecting operating conditions of said combustion engine including rotation speed of said output shaft;
    calculating an ignition spark position of said output shaft of said combustion engine in response to the detected values of said operating conditions;

generating ignition spark voltages for respective cylinders of said combustion engine when the rotational position of said output shaft reaches the calculated value of said ignition spark position; and
rotating said rotatable electrode of said spark voltage distributor by an electric motor at a speed depending upon the detected value of said rotation speed and the calculated value of said ignition spark position so that said rotatable electrode is engaged with said stationary electrodes upon generation of said ignition spark voltages.

2. A method according to claim 1, wherein said conditions detecting step includes the step of producing a train of rotation pulses in each rotation of said output shaft, the number of said rotation pulses being proportional to said rotation speed of said output shaft, and further comprising the step of modulating the number of said rotation pulses in response to the calculated value of said ignition spark position so that, in said electrode rotating step, said electric motor rotates said rotatable electrode by a predetermined angular interval in response to each of the modulated rotation pulses.

3. A method according to claim 2 further comprising the step of calculating the difference between two calculated values calculated in said position calculating step so that, in said modulating step, the number of said rotation pulses is modulated in proportion to the calculated difference.

4. A method according to claim 2, wherein said position calculating step includes the step of determining said calculated value at a constant value irrespective of said detected values of said operating conditions when said combustion engine is cranked, said constant value being indicative of a predetermined reference position of said output shaft, and further comprising the steps of:
producing a first position pulse when said output shaft reaches said reference position;
producing a second position pulse when said rotatable electrode engages with a predetermined one of said stationary electrodes; and
counting the number of said rotation pulses produced between said first and second position pulses so that, when said combustion engine is cranked, the number of rotation pulses is modulated in response to the counted number of said rotation pulses in said modulating step.

5. A method according to claim 4 further comprising the step of calculating the difference between two calculated values calculated in said position calculating step so that, when said engine is not cranked, the number of said rotation pulses is modulated in proportion to the calculated difference.

6. A method according to claim 5 further comprising the steps of:
producing timing pulses in synchronism with respective ignition spark voltages of said spark voltages generating step;
counting the number of said timing pulses; and
initiating said difference calculating step each time the counted number of said timing pulses counting step reaches a predetermined value.

7. A method according to claim 2 further comprising the steps of:
producing a first position pulse when said output shaft reaches said reference position;
producing a second position pulse when said rotatable electrode engages with a predetermined one of said stationary electrodes;
producing timing pulses in synchronism with respective ignition spark voltages of said spark voltage generating step;
counting the number of said timing pulses;
initiating said modulating step each time the counted number of said timing pulses counting step reaches a predetermined value so that, when said second position pulse is produced, said modulating step in which the number of said rotation pulses is modulated in response to said calculated value of said position calculating step is prevented;
counting the number of said rotation pulses between said first and second position pulses when said second position pulse is produced; and
modulating the number of said rotation pulses in proportion to the counted number of said rotation pulses counting step when said second position pulse is produced.

* * * * *